UNITED STATES PATENT OFFICE.

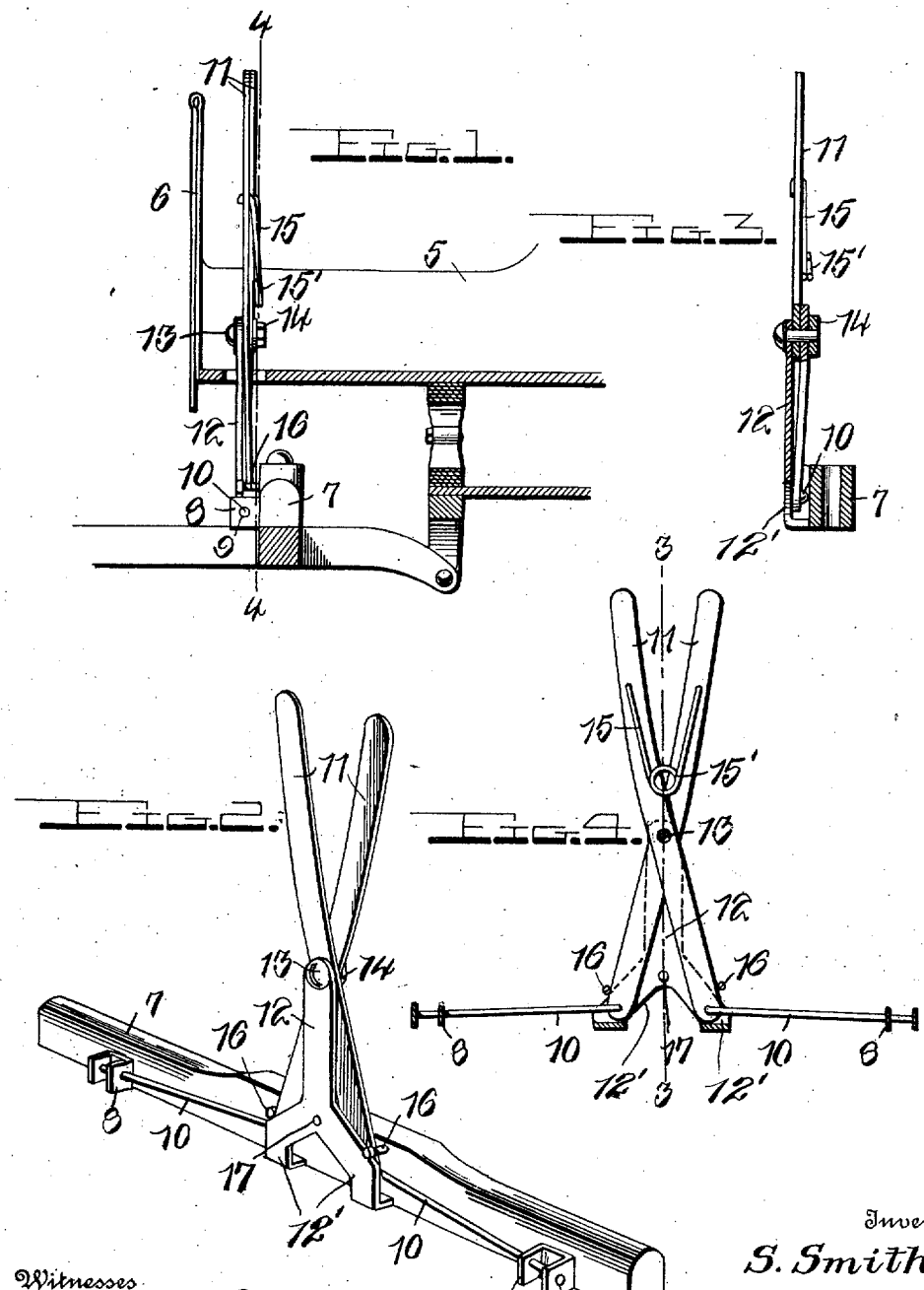

SHIRLEY SMITH, OF MADISON, VIRGINIA.

HORSE-DETACHER.

989,200. Specification of Letters Patent. Patented Apr. 11, 1911.

Application filed April 4, 1910. Serial No. 553,220.

*To all whom it may concern:*

Be it known that I, SHIRLEY SMITH, a citizen of the United States, residing at Madison, in the county of Madison and State of Virginia, have invented certain new and useful Improvements in Horse-Detachers, of which the following is a specification, reference being had to the accompanying drawings.

This invention relates to certain new and useful improvements in horse detachers, and has for its object to provide a very simple device of this character which may be manufactured at a very low cost, is durably constructed, and one which will be highly efficient in operation.

Another object resides in the provision of means arranged upon the draft bar, and adapted to be actuated by the driver of the vehicle whereby the ends of the traces or the swingletrees may be instantaneously released from the draft bar, when the horse becomes uncontrollable.

With these and other objects in view, the invention consists of the novel features of construction, combination and arrangement of parts, hereinafter fully described and claimed and illustrated in the accompanying drawings, in which, Figure 1 is a side elevation showing the device arranged in operative position; Fig. 2 is a perspective view of the draft bar, showing the device arranged thereon; Fig. 3 is a section taken on the line 3—3 of Fig. 4, and Fig. 4 is a section taken on the line 4—4 of Fig. 1.

Referring more particularly to the drawings, 5 indicates the vehicle body, and 6 the dash board thereof. The draft bar 7 is arranged beneath the vehicle between the poles or shafts in the usual manner. To each end of the draft bar a substantially U-shaped plate 8 is secured. The parallel laterally extending arms of these plates are provided with alined openings 9 to receive the ends of the traces or pole-securing movable rods 10. These rods extend inwardly to a point adjacent the center of the draft bar, and are connected to the lower ends of the crossed levers 11. As clearly shown in Fig. 2, these levers are pivotally connected to the upper end of a vertically disposed supporting plate 12, said plate being formed at one end with the diverging arms 12′ which have their extremities extended at a right angle beneath the draft bar and are secured thereto by means of suitable screws or analogous fastening devices. The pivot pin 13 extends through the upper end of the supporting plate 12, and through the crossed levers 11, and has a nut 14 threaded upon one end, which is adapted to be adjusted to engage with the levers and retain the same in their proper positions. These levers are normally held in spaced relation at their opposite ends by means of a spring member 15. This member is formed of resilient wire of the proper gage, and the ends thereof are secured to the levers, said wire being coiled intermediate of its ends, as shown at 15′. The tension of this spring forces the arms thereof apart, and thus yieldingly holds the levers in spaced relation, and normally positions the rods 10 in the U-shaped plates 8 secured to the draft bar. Stop pins 16 are secured in the draft bar to limit the outward movement of the levers 11, and a similar pin 17 is secured to the supporting plate 12 to limit the inward or closing movement of the levers. This movement of the levers 11 withdraws the rods 10 from the plates 8 to a sufficient extent to release the traces or swingletrees. The pin 17 prevents the entire withdrawal of the rods from the U-shaped plates.

As shown in Fig. 1 of the drawings, the levers 11 extend upwardly through the bottom of the vehicle body and are disposed immediately in front of the driver where they may be readily grasped and operated to release the animal from connection to the draft bar.

From the foregoing, it will be seen that I have provided an extremely simple and efficient device, which is capable of very quick operation and by means of which all danger of wrecking the buggy or other vehicle in the event that the horse becomes uncontrollable, is avoided. The device is also extremely durable in construction, and may be manufactured at a low cost.

While I have shown and described the preferred embodiment of the invention, it will be understood that the same is susceptible to many minor modifications without materially departing from the spirit or sacrificing any of the advantages thereof.

Having described my invention, what I claim is:

1. In a device of the character described, the combination with a draft bar, of a substantially U-shaped plate secured to each end thereof, an upright supporting plate having diverging arms disposed in spaced relation to one side of the draft bar and secured to the bottom thereof, crossed levers pivoted to the upper end of said plate and extending between the draft bar and the diverging arms of the plate, a spring coil centrally disposed upon one side of the levers above the pivotal point thereof, the ends of said coil being secured to the respective levers, rods connected to the lower ends of said levers and movably disposed through the arms of said U-shaped plates, said spring normally tending to force the levers apart and dispose the rods through the arms of said plates, means secured to the draft bar to limit the opening movement of the levers, and means secured to the supporting plate to limit the closing movement of said levers and prevent the entire withdrawal of the rods from engagement with said U-shaped plates.

2. In a device of the character described, the combination with a draft bar, of a substantially U-shaped plate secured to each end thereof, an upright supporting plate having diverging arms centrally secured to the draft bar, crossed levers pivoted upon the upper end of said plate, rods connected to the lower ends of said levers, said rods being movably disposed through the arms of said U-shaped plates, a spring connecting said levers adjacent to their upper ends, normally tending to force the same apart, stops secured in the draft bar adapted to be engaged by said levers to limit their opening movement, and a stop secured to the supporting plate to limit the closing movement of said levers, and prevent the entire withdrawal of the rods from engagement with said U-shaped plates.

In testimony whereof I hereunto affix my signature in the presence of two witnesses.

SHIRLEY SMITH.

Witnesses:
G. R. THRIFT,
F. P. SMITH, Jr.

---

Copies of this patent may be obtained for five cents each, by addressing the "Commissioner of Patents, Washington, D. C."